Aug. 29, 1944. J. C. CURTIS Re. 22,536

ROCK DRILL

Original Filed Dec. 4, 1940

Inventor:
John C. Curtis.
by
Louis A. Maxson.
Atty.

Reissued Aug. 29, 1944 Re. 22,536

UNITED STATES PATENT OFFICE 22,536

ROCK DRILL

John C. Curtis, Claremont, N. H., assignor to Sullivan Machinery Company, a corporation of Massachusetts Original No. 2,337,031, dated December 21, 1943, Serial No. 368,508, December 4, 1940. Application for reissue January 21, 1944, Serial No. 519,243

24 Claims. (Cl. 279—19.3)

This is an application for reissue of Letters Patent No. 2,337,031, granted December 21, 1943.

This invention relates to rock drills, and more particularly to improvements in the drill steel chuck mechanism for such drills.

It is customary to provide in a chuck mechanism for supporting and locking a drill steel in a rock drill of the hammer type, an opening at the forward end of the chuck through which the shank of a drill steel with lugs formed upon its sides may be inserted when the drill steel is turned to a certain position. Within the chuck are provided longitudinal grooves for receiving the lugs, and the grooves are of such angular extent throughout their lengths that the drill steel may be partially rotated when the lugs are in any of their positions between the ends of the grooves, to bring the lugs out of registry with the opening and into engagement with suitable abutments. With this arrangement, it is possible for the drill steel to turn appreciably within the chuck during operation of the drill, and it may at any time, except when driven by the chuck, turn into a position bringing the lugs into alinement with the opening. Rotary movement of the drill steel and its lugs within the grooves during operation of the drill causes considerable wear betwen the lugs and the parts of the chuck mechanism, and if the lugs are moved into positions in alinement with the opening at the forward end of the chuck the drill steel may be inadvertently released. By providing a recess within which the lugs may be turned by partially rotating the drill steel when it is in only a certain position in the chuck, and providing grooves within which the lugs are received when the drill steel is in its normal position during operation of the drill, and which prevent rotation of the drill steel, there is obtained a reduced wear and a locking of the drill that prevents its release.

It is an object of this invention to provide an improved rock drill chuck mechanism. It is another object of this invention to provide an improved chuck mechanism having means for holding the drill steel in a locked position during operation of the drill. It is still another object to provide in an improved chuck mechanism means for reducing the relative movement between the drill steel and parts of the chuck mechanism, thereby reducing the wear during operation of the drill. Still another object is to provide an improved drill steel chuck mechanism having improved means for supporting and driving the drill steel and for locking the drill steel within the chuck. These and other objects of the invention will, however, hereinafter more fully appear.

In the accompanying drawing there is shown for purposes of illustration one form which the invention may assume in practice.

In the drawing—

Figure 1:
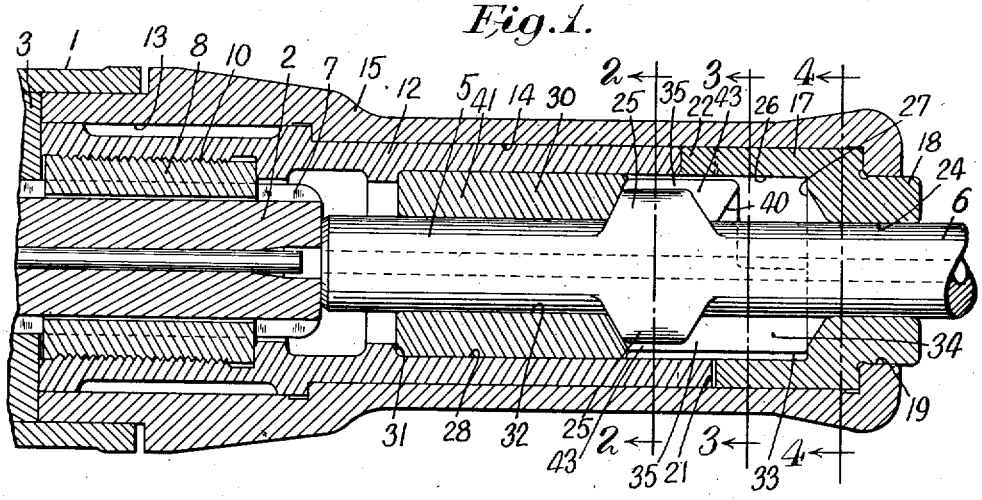
Fig. 1 is a longitudinal section, taken on line 1—1 of Fig. 2, through the forward portion of a rock drill within which the illustrative form of the improved chuck mechanism is embodied.
Figure 2:
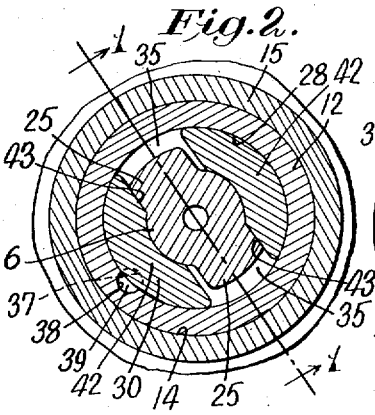
Fig. 2 is a cross sectional view taken on line 2—2 of Fig. 1.
Figure 3:
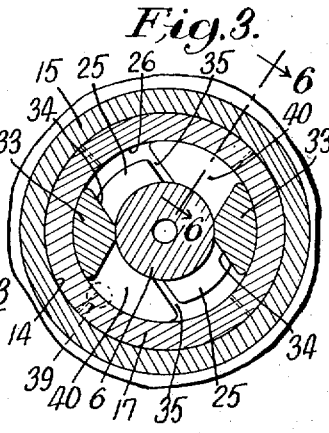
Fig. 3 is a cross sectional view taken on line 3—3 of Fig. 1.
Figure 4:
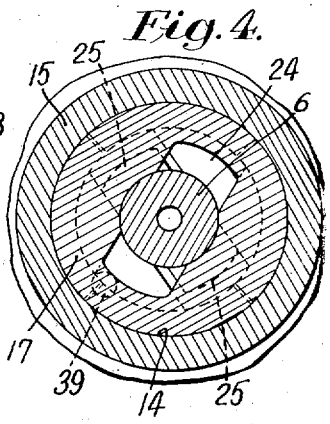
Fig. 4 is a cross sectional view taken on line 4—4 of Fig. 1.
Figure 5:
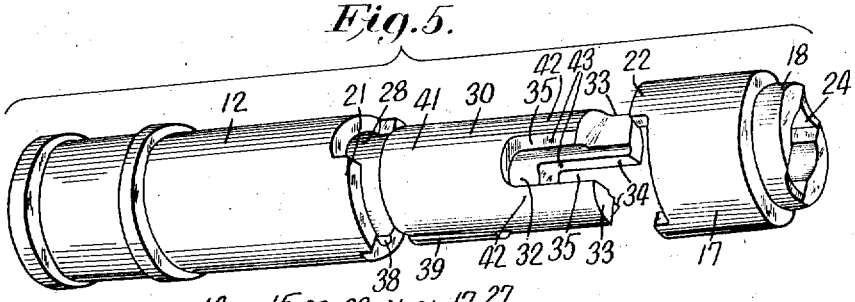
Fig. 5 is a perspective view showing the chuck sleeve, the driving bushing and the retaining ring of the improved chuck mechanism, the parts being shown in positions for assembly.
Figure 6:
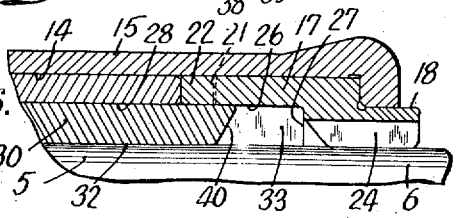
Fig. 6 is a detail sectional view taken on the line 6—6 of Fig. 3.

In the illustrative embodiment of the invention the improved chuck mechanism is embodied in a hammer-type rock drill comprising a cylinder 1 containing a reciprocable hammer piston having a striking bar 2 slidably guided in a front cylinder head 3, and this striking bar is adapted to deliver impact blows to the shank 5 of a drill steel 6. As is usual in rock drills, the hammer piston is rotated as it is reciprocated, and this rotative piston movement is transmitted to the drill steel so that as the latter is percussively acuated, it is at the same time rotated. The piston striking bar 2 is provided with longitudinal grooves 7 interlocked with straight lugs or vanes formed internally within a sleevelike chuck nut 8 threaded at 10 within a chuck sleeve 12 rotatably mounted within bores 13 and 14 formed in a front chuck housing 15. Arranged within the bore 14 at the forward end of the chuck housing is a retaining ring 17 having a reduced portion 18 extending forwardly through an opening 19 at the forward end of the housing. The chuck sleeve and the retaining ring are held against rotation relative to each other when in their assembled position by interlocking clutch jaws 21 and 22 formed at the forward and rearward ends of the chuck sleeve and retaining ring respectively. Opening through the forward end of the retaining ring is a keyway 24 through which the drill steel shank and lugs 25 formed on the shank may be inserted. Within the rearward portion of the retaining ring is an enlarged, circular bore 26 for receiving the lugs 25 after they have been moved rearwardly through the key opening 24. An annular radially extending shoulder 27 is herein shown at the forward end of the bore 26. The chuck sleeve has a longitudinally extending bore 28 of the same diameter as, and in alinement with, the bore 26. A driving bushing 30 fits closely within the bore 28 and abuts against a shoulder 31 formed on the chuck sleeve when moved to its extreme rearward position. Extending through the driving bushing is a bore 32 for receiving the rearward end of the drill steel shank and for supporting the latter in a position to receive impact blows from the striking bar 2. At the forward end of the driving bushing is a pair of diametrically opposite projections 33 extending within the bore 26 of the retaining ring, and these projections provide abutment surfaces 34 for engagement by the lugs on the drill steel shank when the drill steel is rotated within the bore 26 to move the lugs out of alinement with the keyway 24. Desirably these projections abut, or substantially abut, the shoulder 27 when the parts are in assembled relation. Extending rearwardly from the projections 33 are slots 35 formed in the driving bushing for receiving the lugs on the drill steel shank when they have been moved into engagement with the abutment surfaces 34 and then moved rearwardly within the chuck. The slots are of such width that only a slight turning of the drill steel is permitted when the drill steel lugs are received in them and the drill is held against release from the key opening 24. The projections 33 on the driving bushing, extending forwardly, engage the retaining ring at the forward end of the bore 26 as above described, and hold the driving bushing against the shoulder 31 on the chuck sleeve when the chuck mechanism is assembled. The driving bushing may be made to fit the bore 28 in the chuck sleeve so closely that nothing more will be needed to hold it against turning relative to the chuck sleeve, but to make sure that the driving bushing and chuck sleeve are assembled and held in their proper positions there is formed within the outer surface of the driving bushing a groove 37 that registers with a groove 38 formed within the wall of the bore 28 in the chuck sleeve and forms an opening for a suitable locking pin 39.

The projections 33 on the driving bushing are shown as being of such length that there is provided between the forward end of the bore 26 in the retaining ring and the forward faces 40 of the driving bushing at the base of the projections 33 a space that is of but slightly greater length than the lugs on the drill steel shank. As the drill steel lugs are moved through the key opening 24 they enter the bore 26 and are permitted to move rearwardly, before engaging the surfaces 40, only far enough to bring them completely within the bore so the drill steel can be rotated to bring the lugs against he abutment surfaces 34 on the projections 33. After the lugs have been moved against the abutments 34 they are in position to be received by the slots 35, and the drill steel can be moved rearwardly in the chuck to a position for receiving the blows from the striking bar. The space within which the drill steel may be rotated may of course be varied in length, but to reduce the chances of an inadvertent release of the drill it is desirable to hold the length to a minimum. The driving bushing may be noted to comprise a rearward annular portion 41 having forwardly projecting mutually opposite portions 42 spaced from each other by the slots 35, these slots providing driving surfaces 43 to engage and drive the steel lugs; and the portions 42 terminate, except for their projections 33, in conical surfaces 40 as above noted, which limit the initial inserting movement of the steel.

As a result of this invention it will be noted that an improved chuck mechanism has been provided wherein the drill steel is positively locked within the chuck during operation of the drill. It will further be noted that the drill steel is prevented from moving appreciably within the chuck mechanism during operation of the drill and the wearing of the parts is reduced. The mechanism is of rugged construction and may be easily assembled. The driving bushing has portions of the wall of its bore 32 extend forwardly even to the foremost ends of the projections 33, and, of course, has relatively wide portions adapted closely to fit the steel shank at points between the slots 35. Thus the wear on the drive bushing is kept at a minimum. These and other uses and advantages of the improved chuck mechanism will be clearly apparent to those skilled in the art.

While there is in this application specifically described one form which the invention may assume in practice, it will be understood that this form of the same is shown for purposes of illustration and that the invention may be modified and embodied in various other forms without departing from its spirit or the scope of the appended claims.

What I claim as new and desire to secure by Letters Patent is:

1. In a rock drill chuck mechanism for use with a lugged drill steel, in combination, a rotating chuck sleeve, a member rotatable with said chuck sleeve and having an opening for receiving the shank and lugs of a drill steel, a recess within said member for receiving the drill steel lugs and within which said lugs are movable relative to said opening upon rotation of said drill steel, a driver member for receiving and driving the shank of said drill steel and rotatable with said chuck sleeve, projectiong portions formed on said driver member and providing abutment surfaces against which said lugs abut on predetermined movement of said lugs in said recess, and grooves in said driver member for receiving said lugs and holding said drill steel against rotation relative to said member.

2. In a rock drill chuck mechanism for use with a lugged drill steel, in combination, a rotating chuck sleeve, a member rotatable with said chuck sleeve and having an opening for receiving the shank and lugs of a drill steel, a recess within said member, circular in cross section, for receiving the drill steel lugs and within which said lugs are movable relative to said opening upon rotation of said drill steel, a driver member arranged within said chuck sleeve for receiving and driving the shank of said drill steel and rotatable with said chuck sleeve, and grooves in said driver member for receiving said lugs on predetermined angular movement of the latter in said recess and locking said drill steel against rotation relative to said member.

3. In a rock drill chuck mechanism for use with a lugged drill steel, in combination, a rotating chuck sleeve, a member rotatable with said chuck sleeve and having an opening for receiving the shank and lugs of a drill steel, a recess within said member, circular in cross section, for receiving the drill steel lugs and within which said lugs are movable relative to said opening upon rotation of said drill steel, and a driver member for receiving and driving the shank of said drill steel and rotatable with said chuck sleeve, said driver member having grooves therein extending longitudinally thereof for receiving said lugs on predetermined rotation of said drill steel and holding said drill steel against rotation relative to said member and said driver member further having projections extending into said recess for guiding said lugs into said grooves.

4. In a chuck mechanism for supporting and rotating a lugged drill steel, the combination comprising a rotating chuck sleeve, a member rotating with said chuck sleeve and having an opening for receiving the shank and lugs of a drill steel, a recess within said member for receiving the shank and lugs of said drill steel and within which said lugs are movable angularly relative to said opening upon rotation of said drill steel, means providing surfaces for limiting the angular movement of said lugs in said recess, and means for receiving said lugs and holding said drill steel against rotation relative to said member in a position out of contact with said surfaces.

5. In a chuck mechanism for supporting and rotating a lugged drill steel, the combination comprising a rotating chuck sleeve, a member rotating with said chuck sleeve and having an opening for receiving the shank and lugs of a drill steel, said member providing a chamber for receiving the shank and lugs of said drill steel and within which said lugs are movable relative to said opening upon rotation of said drill steel, and means rotating with said chuck sleeve and providing grooves for receiving said lugs and holding said drill steel against rotation relative to said member and further providing abutments extending into said chamber for halting rotation of said steel with the lugs thereof in alinement with said grooves.

6. In a chuck mechanism for supporting and rotating a lugged drill steel, the combination comprising a rotating chuck sleeve, a member rotating with said chuck sleeve and having an opening for receiving the shank and lugs of a drill steel, said member providing a chamber for receiving the shank and lugs of said drill steel and within which said lugs are movable angularly relative to said opening upon rotation of said drill steel, and means rotating with said chuck sleeve and providing a wall for said chamber and also grooves for receiving said lugs after movement of the latter against said wall in said chamber and holding said drill steel against rotation relative to said member.

7. In combination, in a chuck mechanism for supporting and rotating a lugged drill steel, a chuck sleeve and a locking ring connected for turning together and providing a circular recess to receive and permit turning of the lugs of a drill steel into and out of locked position, and a driver member within said chuck sleeve having a bore for receiving the shank of the drill steel and spaced portions between which the drill steel lugs are receivable for holding the latter in locked position and providing surfaces which are adapted drivingly to engage such lugs, said spaced portions having forward projections providing surfaces in alinement with the driving surfaces on said portions for limiting the rotation of the lugs of the drill steel.

8. In combination, in a chuck mechanism for supporting and rotating a lugged drill steel, a chuck sleeve and a locking ring connected for turning together and providing a circular recess to receive and permit turning of the lugs of a drill steel into and out of locked position, and a driver member within said chuck sleeve having a bore for receiving the shank of the drill steel and spaced portions between which the drill steel lugs are receivable for holding the latter in locked position and providing surfaces which are adapted drivingly to engage such lugs, said spaced portions having forward surfaces limiting the insertion of the lugs of the drill steel while the latter is in unlocked position, and said spaced portions also having, extending forwardly beyond said forward surfaces, projections for limiting rotation of the drill steel within the circular recess and guiding the lugs of the drill steel for rearward movement between said spaced portions, said projections engageable at their forward ends with said locking ring.

9. In combination, in a chuck mechanism for supporting and rotating a lugged drill steel, a rotating chuck sleeve, a member rotating with said chuck sleeve and having an opening for receiving the shank and lugs of a drill steel, said member providing a chamber for receiving the shank and lugs of said drill steel and within which said lugs are movable angularly relative to said opening into and out of locked position upon rotation of said drill steel, a driver member rotating with said chuck sleeve and having a bore providing a bearing surface for said drill steel shank, projecting portions formed on said driver member and extending into said chamber for stopping angular movement of said lugs in locked position, and notches in said driver member extending rearwardly from said projecting portions and having substantially the same transverse dimensions as said lugs for receiving the latter and holding them in locked position.

10. In a chuck mechanism for supporting and rotating a lugged drill steel, the combination comprising a rotating chuck sleeve, a member rotating with said chuck sleeve and having an opening for receiving the shank and lugs of a drill steel, a recess formed in said member for receiving the lugs of said drill steel and within which said lugs are movable angularly relative to said opening into and out of a locking position upon rotation of said drill steel, abutment means for stopping the angular movement of said lugs in said recess in said locking position, and a driver member rotating with said chuck sleeve and having grooves extending rearwardly from said abutment means for receiving said lugs when moved to said locking position and holding said drill steel against rotation relative to said first mentioned member.

11. In combination, in a chuck mechanism for supporting and rotating a lugged drill steel, a chuck sleeve and a locking ring connected for turning together, an opening extending through said locking ring for receiving the shank and lugs of a drill steel, a recess in said locking ring for receiving the lugs of said drill steel and within which said lugs are movable angularly relative to said opening into and out of a locking position upon rotation of said drill steel, a driver member within said chuck sleeve and having forward surfaces limiting the insertion of the drill steel lugs within said recess, projecting portions on said driver member limiting the angular movement of the lugs of said drill steel within said recess to a locking position, and spaces in said driver member of substantially the same transverse dimensions as said lugs for receiving the latter after being moved to locking position and holding the same against angular movement.

12. In a drill steel chuck mechanism, a rotatable driver member having parallel projections, a locking member connected to said driver member for rotation therewith and having a front key opening and a circular recess, the lugs of a drill steel shank being insertable through said key opening into said recess and the steel being turnable to move said lugs laterally in said recess to bring the lugs out of registry with the key opening, and said projections on said driver member extending forwardly into said circular recess and providing stop surfaces for the lugs for limiting turning of the steel when the latter is locked in the chuck mechanism.

13. In a drill steel chuck mechanism, a rotatable driver member having parallel projections, a locking member connected to said driver member for rotation therewith and having a front key opening and a circular recess, the lugs of a drill steel shank being insertable through said key opening into said recess and the steel being turnable to move said lugs laterally in said recess to bring the lugs out of registry with the key oepning, said projections on said driver member extending forwardly into said circular recess and providing stop surfaces for the lugs for limiting turning of the steel when the latter is locked in the chuck mechanism, and said driver member having an opening for receiving the steel shank and having abutment surfaces located rearwardly of said projections and engageable with the steel lugs for rotating the steel with said driver member.

14. In a drill steel chuck mechanism, a chuck housing, a driver member rotatable within said housing and having a central bore for receiving the shank of a drill steel and lateral grooves for receiving the lugs on the steel shank, said grooves preventing substantial rotation of the steel in either direction with respect to the driver member while permitting longitudinal reciprocation of the steel, a locking member rotatable within said housing and having a front key opening and a rearward circular bore, the steel lugs being insertable through said key opening into said circular bore and said steel lugs being rotatable in the circular bore to move out of registry with said key opening to lock the steel in the chuck mechanism, said locking member being connected to said driver member for rotation therewith, and said driver member having parallel projections extending forwardly into said circular bore in said locking member, said projections providing stops for the steel lugs with which the latter are engageable for locating the lugs in registry with said grooves when the steel is in locked position in the chuck mechanism, said steel shank when said lugs are in engagement with said projections being movable rearwardly into the bore of said driver member and said grooves receiving the steel lugs as the steel is moved rearwardly.

15. In a chuck mechanism for supporting, rotating and retaining a lugged drill steel, the combination comprising a chuck housing having a bore for rotatably receiving steel supporting and rotating and steel retaining devices, a retainer member rotatably supported in said bore and having intercommunicating openings for receiving the shank and lugs of a drill steel and rearwardly of said openings a circular recess in which the lugs of the steel are rotatable out of alinement with the first mentioned openings for receiving them, and means forming a chuck rotatably received in said bore rearwardly of said retainer member and providing surfaces for limiting the angular movements of the lugs in said recess and slots for receiving said lugs and holding said drill steel against substantial rotation in either direction relative to said chuck-forming means.

16. In a chuck mechanism for supporting, rotating and retaining a lugged drill steel, the combination comprising a chuck housing having a bore for rotatably receiving steel supporting and rotating and steel retaining devices, a retainer member rotatably supported in said bore and having intercommunicating openings for receiving the shank and lugs of a drill steel and rearwardly of said openings a circular recess in which the lugs of the steel are rotatable out of alinement with the first mentioned openings for receiving them, and means forming a chuck rotatably supported in said bore rearwardly of said retainer member and providing surfaces for limiting rectilinear movement of said lugs inwardly after they pass through the first mentioned openings for receiving them and further providing surfaces for limiting the angular movements of the lugs in said recess and slots for receiving said lugs and holding said drill steel against substantial rotation in either direction relative to said chuck-forming means.

17. In a chuck mechanism for supporting, rotating and retaining a lugged drill steel, the combination comprising a chuck housing having a bore for rotatably receiving steel supporting and rotating and steel retaining devices, a retainer member rotatably supported in said bore and having intercommunicating openings for receiving the shank and lugs of a drill steel and rearwardly of said openings a circular recess in which the lugs of the steel are rotatable out of alinement with the first mentioned openings for receiving them, and means forming a chuck rotatably supported in said bore rearwardly of said retainer member and having portions projecting forwardly into said circular recess for limiting turning of said lugs about the axis of the steel and providing surfaces for limiting the angular movements of the lugs in said recess and slots for receiving said lugs and holding said drill steel against substantial rotation in either direction relative to said chuck-forming means.

18. In a chuck mechanism for supporting, rotating and retaining a lugged drill steel, the combination comprising a rotatable chuck sleeve, a driver member having a bore for receiving a drill steel shank, said driver member further having grooves for receiving the lugs of a drill steel and also having forwardly projecting portions certain sides of which are in alinement with certain walls of said grooves and the other sides of which are angularly spaced from the opposite walls of said grooves, said driver member having transverse surfaces extending between said last mentioned surfaces and said grooves, and a locking member having communicating shank and lug receiving openings through which the steel shank and lugs may be passed and a circular recess communicating with said openings in which said lugs are rotatable, said projecting portions extending into said recess for limiting the turning of the lugs therein and said transverse surfaces limiting inward movement of said lugs in said recess, and said driver member and said chuck sleeve fixed against relative rotation and said chuck sleeve and said locking member connected together with said grooves out of alinement with the lug receiving openings in said locking member.

19. In a drill steel chuck mechanism, a rotatable driver member having parallel forwardly extending projections, a locking member connected to said driver member for rotation therewith and having a front key opening and a rearwardly disposed circular recess, said key opening being formed to permit the passage of the lugs of a drill steel shank therethrough and said recess being of an internal diameter to permit free turning movement between said lugs and said locking member, said projections on said driver member extending forwardly into said circular recess and providing stop surfaces to cooperate with the lugs for limiting relative turning movement between the steel and said locking member, and said driver member further providing openings for receiving the lugs and holding the drill steel against substantial rotation in either direction relative to said driver member, said last mentioned openings bounded at their rearward sides, in terms of driver member rotation, by surfaces of which said stop surfaces constitute forward extensions.

20. In a chuck mechanism for supporting, rotating and retaining a lugged drill steel, the combination comprising a chuck housing having a bore, a retainer member rotatably supported in said bore and having intercommunicating openings for receiving the shank and lugs of a drill steel and, rearwardly of said openings, a circular recess of a diameter such as to receive the lugged portion of a steel and permit free relative rotation between such portion and said retainer member, and means forming a chuck also rotatably supported in said bore and disposed rearwardly of said retainer member and providing surfaces for limiting rectilinear movement of the lugs inwardly after they pass through the first mentioned openings for receiving them, and further providing a bore and diametrically oppositely disposed recesses communicating with said bore, said bore and said last mentioned recesses adapted respectively to receive the shank portion and the lugs of a drill steel, and said chuck forming means still further providing surfaces extending forwardly substantially to the forward end of said circular recess, said second mentioned recesses receiving the lugs during drilling and holding the drill steel against substantial rotation in either direction relative to the chuck forming means, and said surfaces constituting forward extensions of the rearward sides of said last mentioned recesses whereby, whether during drilling or during removal of the steel from a hole, the lugs of the steel may be driven over the major portion of the rearwardly facing sides thereof.

21. In a drill steel chuck mechanism, a rotatable driver member, a locking member connected to said driver member for rotation therewith and having a front key opening, one of said members having a circular recess and the other member having parallel projections extending into said recess, said key opening being formed to permit the passage of the lugs of a drill steel shank therethrough, and said recess being of an internal diameter to permit free turning movement between the lugs and said locking member, said projections extending into the circular recess and providing stop surfaces to cooperate with the lugs for limiting relative turning movement between the steel and said members, and said driver member providing openings for receiving the lugs of the drill steel and holding the same against substantial rotation in either direction relative to the driver member, said last mentioned openings bounded at their rearward sides, in terms of driver member rotation, by surfaces substantially coplanar with said stop surfaces on said projections.

22. In a drill steel chuck mechanism, a chuck housing having a bore, a rotatable driver member in said bore, a separate locking member in said bore, said locking member connected to said driver member for rotation therewith and having a front key opening, said driver member and said locking member cooperating to provide the boundaries of a recess of such size and conformation as to permit turning movement between the lugs of a lugged drill steel and said locking member, and said key opening being formed to permit the passage of a lugged drill steel shank therethrough and into said recess, and one of said members having projections thereon extending into said recess and providing stop surfaces to cooperate with the lugs of a drill steel for limiting relative turning movement between the steel and said members, and said driver member providing openings for receiving the lugs of a drill steel and holding the same against substantial rotation in either direction relative to the driver member, said last mentioned openings bounded at their rearward sides, in terms of driver member rotation, by surfaces whose longitudinally extending elements are substantially in alinement with longitudinally extending elements of said stop surfaces.

23. In a drill steel chuck mechanism, a chuck housing having a bore, a rotatable driver member in said bore, a locking member also in said bore and detachably connected to said driver member for rotation therewith and having a front key opening, said key opening being formed to permit the passage of the lugs of a lugged drill steel shank therethrough, and said members cooperating to bound an internal chamber having portions in which said lugs are turnable relative to said members and having longitudinally extending, substantially diametrically oppositely disposed walls for limiting the relative movement between said lugs and said members and halting the relative turning movement in a position in which said lugs are angularly displaced with respect to said key opening, said driver member formed to provide substantially diametrically oppositely disposed openings for receiving the lugs when the same have passed rearwardly beyond said chamber and to maintain said lugs against substantial rotation in either direction relative to said driver member when in said openings, said openings last mentioned having at their rearward sides, in terms of driver member rotation, walls each of which lies in substantially the same surface with one of said first mentioned walls.

24. In a chuck mechanism for supporting, rotating and retaining a lugged drill steel, the combination comprising a chuck housing having a bore for rotatably receiving steel supporting and rotating and steel retaining devices, a retaining member rotatably supported in said bore and having intercommunicating openings for receiving the shank and lugs of a drill steel, the drill steel and said retaining member being relatively rotatable to effect a positioning of the parts in which the steel lugs are out of registry with said lug receiving openings, to lock the steel in the chuck mechanism, and means forming a chuck rotatably received in said bore rearwardly of said retainer member and to which the latter is detachably connected and which is held against rotation relative to said retainer member and which provides surfaces for limiting the angular movements of the lugs when the latter are in locked position with respect to said retainer member, and longitudinal recesses for receiving said lugs and holding the steel against substantial rotation in either direction relative to said chuck forming means.

JOHN C. CURTIS.